(12) United States Patent
Taylor, Jr. et al.

(10) Patent No.: US 6,999,021 B2
(45) Date of Patent: Feb. 14, 2006

(54) METHOD AND APPARATUS FOR DETECTING, MAPPING AND LOCATING UNDERGROUND UTILITIES

(75) Inventors: David W. A. Taylor, Jr., Greensboro, NC (US); Alan G. R. Bell, Alexandria, VA (US); John S. Rolland, Manassas, VA (US); Matthew W. McGarvey, Springfield, VA (US); William H. A. McBride, Washington, DC (US); Yuri Rosenberg, Bethesda, MD (US); George R. A. Fields, Tuckasegee, NC (US); William T. Faulkner, Cullowhee, NC (US)

(73) Assignee: ENSCO, Inc., Falls Church, VA (US)

(*) Notice: Subject to any disclaimer, the term of this patent is extended or adjusted under 35 U.S.C. 154(b) by 0 days.

(21) Appl. No.: 10/095,110

(22) Filed: Mar. 12, 2002

(65) Prior Publication Data
US 2002/0130806 A1 Sep. 19, 2002

Related U.S. Application Data

(60) Provisional application No. 60/274,617, filed on Mar. 12, 2001.

(51) Int. Cl.
*G01V 3/12* (2006.01)
*G01S 13/89* (2006.01)
(52) U.S. Cl. .......................... 342/22; 342/27; 342/191
(58) Field of Classification Search .............. 342/22, 342/59, 129, 147, 149, 190–192; 324/326–329, 324/67
See application file for complete search history.

(56) References Cited

U.S. PATENT DOCUMENTS

| | | | |
|---|---|---|---|
| 3,651,395 A | | 3/1972 | Owen et al. |
| 4,924,450 A | | 5/1990 | Brashear et al. |
| 4,951,055 A | | 8/1990 | Katayama ..................... 342/22 |
| 5,001,430 A | * | 3/1991 | Peterman et al. ........... 324/326 |
| 5,093,622 A | * | 3/1992 | Balkman ..................... 324/326 |
| 5,294,937 A | | 3/1994 | Ostteen et al. .............. 342/459 |
| 5,361,029 A | * | 11/1994 | Rider et al. ................. 324/326 |
| 5,471,143 A | | 11/1995 | Doany ........................ 324/326 |
| 5,541,516 A | | 7/1996 | Rider et al. ................. 324/326 |
| 5,568,152 A | * | 10/1996 | Janky et al. ........... 342/357.08 |
| 5,570,028 A | | 10/1996 | Sperlazzo et al. .......... 324/528 |
| 5,576,973 A | * | 11/1996 | Haddy ................... 342/357.06 |
| 5,629,626 A | | 5/1997 | Russell et al. .............. 324/345 |
| 5,640,092 A | | 6/1997 | Motazed et al. ............ 324/326 |
| 5,644,314 A | | 7/1997 | Ahmad et al. ................ 342/22 |
| 5,680,048 A | * | 10/1997 | Wollny ....................... 324/329 |

(Continued)

OTHER PUBLICATIONS

U.S. Appl. No. 10/373,095, filed Feb. 26, 2003, David W.A. Taylor, et al.; "System and Method for Detecting, and Locating Underground Objects" (Specification, Claims, Drawings and Amendment filed May 24, 2004).

*Primary Examiner*—Thomas H. Tarcza
*Assistant Examiner*—Isam Alsomiri
(74) *Attorney, Agent, or Firm*—Nixon Peabody LLP; Jeffrey L. Costellia

(57) ABSTRACT

The method and device for locating underground utilities within an area includes traversing the area with a plurality of underground utility sensors and obtaining area location data to locate the area traversed. The sensor data and area location data are used to map the location of one or more utilities within the area traversed.

28 Claims, 5 Drawing Sheets

U.S. PATENT DOCUMENTS

| | | |
|---|---|---|
| 5,711,381 A | 1/1998 | Archambeault et al. ...... 175/45 |
| 5,819,859 A | 10/1998 | Stump et al. .................. 175/26 |
| 5,949,373 A | 9/1999 | Eslambolchi et al. .. 342/357.13 |
| 6,026,135 A | 2/2000 | McFee et al. ................ 376/159 |
| 6,053,260 A * | 4/2000 | Boon et al. .................... 173/90 |
| 6,067,039 A | 5/2000 | Pyner et al. |
| 6,082,466 A | 7/2000 | Gudat ............................ 172/5 |
| 6,091,715 A * | 7/2000 | Vucetic et al. .............. 370/277 |
| 6,125,326 A | 9/2000 | Ohmura et al. ............. 701/213 |
| 6,211,807 B1 * | 4/2001 | Wilkison ..................... 342/22 |
| 6,437,726 B1 * | 8/2002 | Price ........................... 342/22 |
| 6,501,414 B2 | 12/2002 | Arndt et al. |
| 6,536,553 B1 * | 3/2003 | Scanlon ...................... 181/108 |
| 6,609,451 B1 | 8/2003 | Inoue et al. |
| 6,670,906 B1 | 12/2003 | Roberts et al. |
| 2002/0184235 A1 * | 12/2002 | Young et al. ............ 707/104.1 |

\* cited by examiner

METHOD AND APPARATUS FOR DETECTING, MAPPING AND LOCATING UNDERGROUND UTILITIES

This application is based upon provisional application Ser. No. 60/274,617 filed Mar. 12, 2001.

FIELD OF THE INVENTION

The present invention provides for the detection, mapping and locating of underground utilities such as gas, electric, telephone, water, etc. using multiple sensors to provide spatially registered digital sensor data from which spatially registered positions of underground utilities can be determined.

BACKGROUND OF THE INVENTION

Conventional practice for locating underground utilities involves a manual, audio technique where a technician using a hand-held sensor with audio feedback first assumes where the target utility is located so that he can place a sensor on the assumed location to manually track the location of a utility based upon the audio feedback. The technician then makes paint marks on the ground over the underground utility so that this location can be subsequently mapped and so that an excavator can see the expected location of the utility.

This manual audio technique is subject to a number of problems. It requires a knowledgeable operator capable of assuming generally where a target utility is located so that a transmitter can be placed on the target utility and then used to manually follow the feedback signal. Since at least an assumption of utility location is required, unexpected utilities are routinely missed.

An operator needs to be able to sort-out conflicting audio signals in complicated environments, and still errors can be made as signals jump from one utility to the next. With this technique, utility depth information is so inaccurate that it is usually not recorded.

In more recent cable locating systems, the operator uses a conventional cable locator to find a cable and then, instead of paint, uses (Global Positioning System) GPS data to mark the location.

The operator, by interpretation of cable location, attempts to manually locate the cable locator over the cable. Then as the operator manually attempts to track along the cable using the cable locator, he periodically marks the location of the cable locator using the GPS system to thereby record the cable location. This technique, which is disclosed by U.S. Pat. No. 5,576,973 to Haddy, is subject to the difficulties previously enumerated for similar manual techniques. Only a single cable within an area is tracked, and accuracy is predicated upon the operator's interpretation as to where the underground cable may be located. Also GPS data alone may not be sufficiently accurate to track a small underground utility, such as a cable, without additional data from a stationary receiver.

SUMMARY OF THE INVENTION

The present invention provides a novel and improved method and apparatus for detecting, locating and rapidly mapping underground utilities from multiple field sensor measurements collected on the ground surface. Multiple sensors are used to scan an area of interest to locate all underground utilities in the area.

Another object of the present invention is to provide a novel and improved method and apparatus for detecting, rapidly mapping and then locating underground utilities. Sensor data from a multiplicity of different sensors or a sensor unit is digitized and combined with precision position data to generate utility maps. No operator interpretation of utility location is required but instead, sensor and position data for an area is mapped and then utilities are located on the mapped data.

A further object of the present invention is to provide a novel and improved method and apparatus for detecting, locating and rapidly mapping underground utilities. A plurality of sensors having different capabilities are mounted on a movable support to provide a sensor unit, and the sensor outputs are digitized and mapped to provide utility location and depth data. The support also carries a system for providing positioning data which is combined with the sensor data to generate maps showing the location and depth of all underground utilities in a located area.

Using this method and apparatus, a trained operator is not required to precisely locate and follow along a specific single underground utility. Instead, an operator merely traverses back and forth across a general area of interest and sensor data from all underground utilities in the area as well as area location data is mapped. This data is beamformed to a suite of directions to determine which orientation indicates the presence of linear features indicative of utility location. Showing a map of the available data should allow the operator to visually interpret the solution and thus, make a digital record of it by tracing with a computer mouse or other pointing device. Automatic interpretation and analysis using beamforming may be optionally provided as well.

A still further object of the present invention is to provide a novel and improved method and apparatus for detecting, rapidly mapping and then locating underground utilities. Data from multiple sensors of different types in a sensor unit are integrated along a variety of directional paths to find the orientation most likely to contain a utility.

DESCRIPTION OF THE PREFERRED EMBODIMENTS

Figure 1:
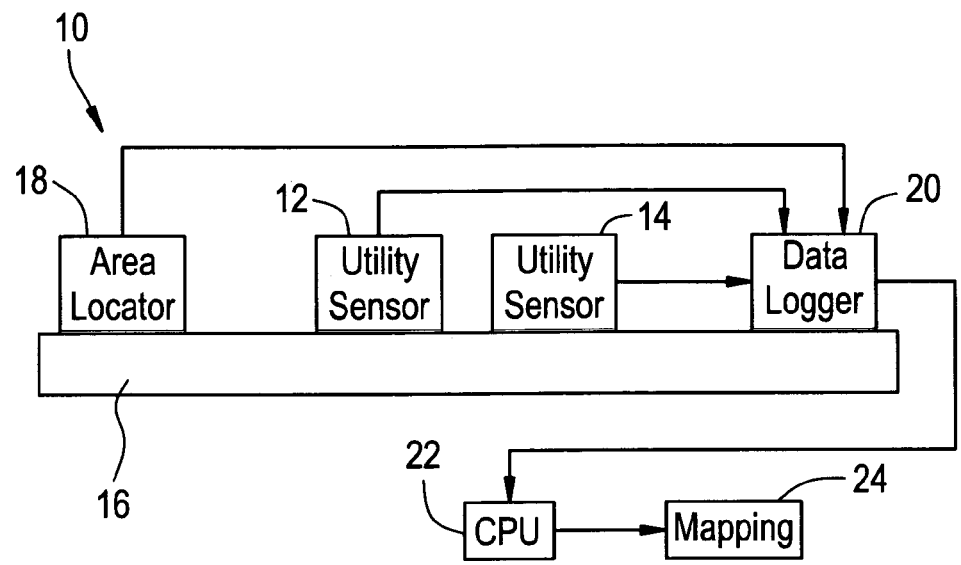
FIG. 1 is a block diagram of the apparatus for detecting, mapping and locating underground utilities of the present invention.

The apparatus for detecting, mapping and locating underground utilities of the present invention indicated generally at 10 includes a plurality of utility sensors 12 and 14 of different types in a sensor unit mounted on a movable support 16 with an area position locating system 18. Digital sensor data from the plurality of utility sensors is developed and stored with digital area position data developed from the area position locating system. This data is stored in a digital data logger 20 and combined in a post-processing data analysis that exploits the marriage of utility sensor with area position data to thereby allow provision of maps of underground utility location and depth within an area. This can be achieved by transferring data from the data logger to a processor 22 which provides data to a mapping unit 24.

The underground utility sensors of the sensor unit could include electromagnetic sensors (such as a Geonics EM61), magnetic sensors (such as a Geometrics G-858), and cable locators (such as a Radio Detection RD 400). The cable locators may include transmitters of different frequencies to provide multiple transmitters (as many as 10 or 20) at multiple frequencies operating simultaneously to provide data which is digitized for data analysis. Additionally, the underground utility sensors of the sensor unit can include a ground penetrating radar system to provide utility depth data based upon the spatially variable arrival time of the radar signal. Depth data can also be derived from the electromagnetic sensor data provided by a three dimensional cable locator with directionally oriented antennas. By providing a cable locator with three orthogonal detectors that are oriented mutually perpendicular to one another, the depth of the underground utility can be calculated.

Conventional cable locators normally include a single sensor responsive to a specific frequency range. This sensed frequency may constitute a 60 Hz signal on line, RF signals from broadcast stations in the area which appear on the cable, or RF signals imposed by separate transmitters located in the survey area of interest.

In accordance with one embodiment of the present invention, a novel cable locator which includes three or more orthogonal sensors arranged in a sensor unit to provide wideband measurement of electromagnetic fields with software or possibly filter separation of the different field components and several portable transmitter units that are selectable for different distinct frequencies preferably. Thus, instead of measuring only one frequency at a time, the cable locator will measure multiple frequency ranges simultaneously and separate the different frequencies in software. By using transmitters with a wider range of available frequencies, each transmitted frequency being narrowband, many transmitters each transmitting a different narrowband frequency can be located in a survey area of interest so that data can be acquired from the different transmitters simultaneously. The emissions from each transmitter (and hence the effected utilities) can be distinguished by the different frequencies to assist in locating different utilities within the area of interest.

Additionally, the cable locator will include three mutually orthogonal sensors in a sensor unit that totally define the magnetic field being measured thereby allowing the three dimensional orientation of the sensed electromagnetic field to be determined. This allows any intermediate orientation of the underground utility to be calculated, such as at 45 degrees to the vertical, etc.

Figure 2A:
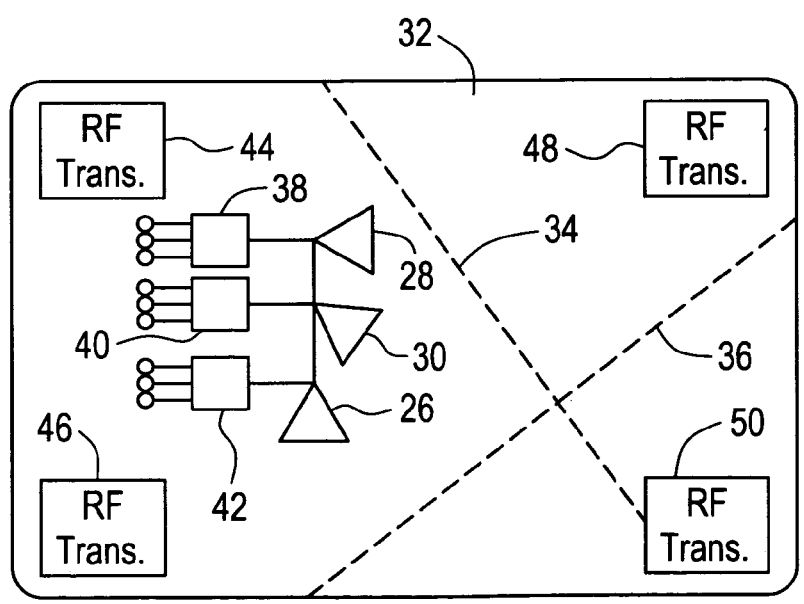
FIG. 2A is a block diagram of the cable locator system used with the present invention.
Figure 2B:
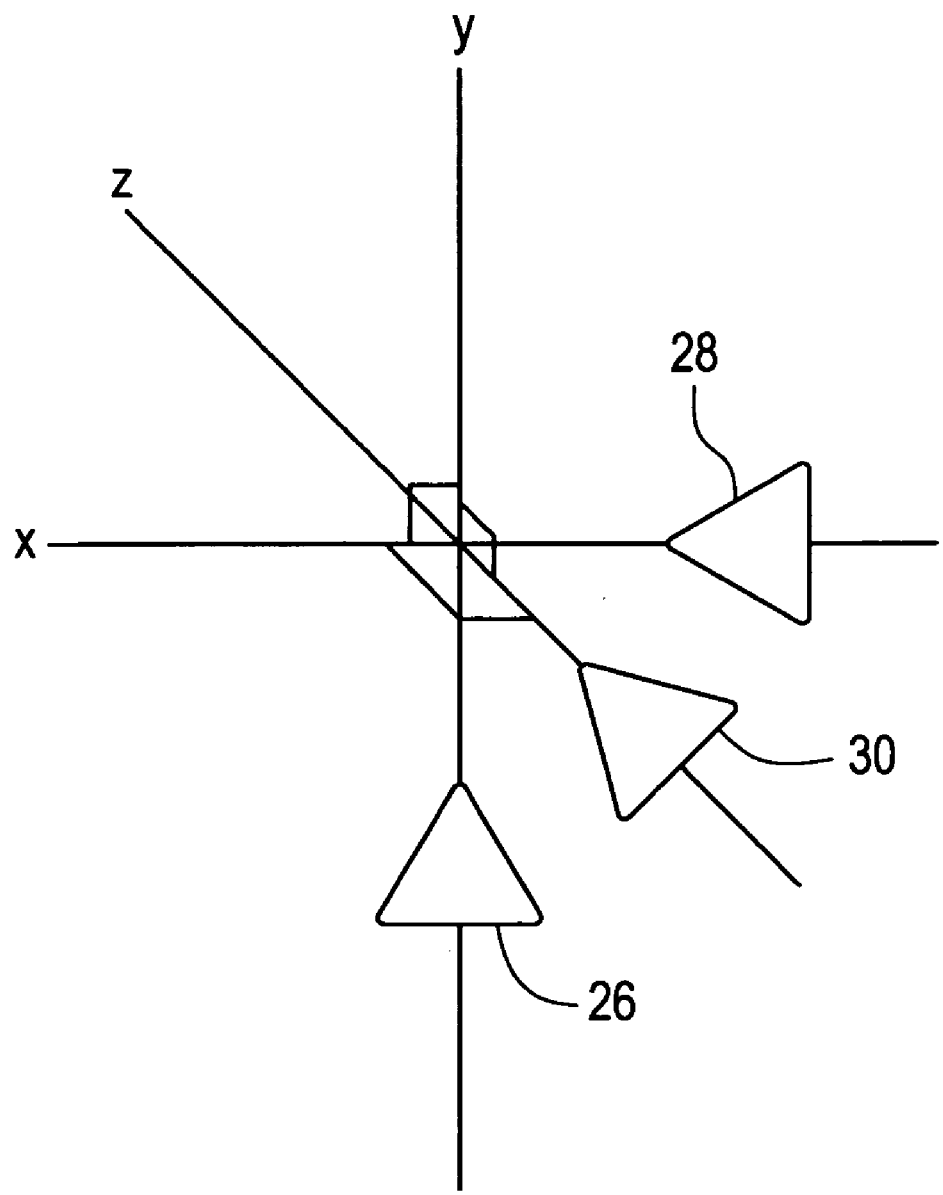
FIG. 2B is a schematic diagram showing the orientation of the wideband sensors in accordance with one embodiment of the present invention.

FIG. 2A is a block diagram of the novel cable locator system used with the present invention. This system includes a plurality of wideband electromagnetic field sensors 26, 28 and 30 oriented orthogonal to one another, i.e. one vertically, one horizontally and one orthogonally to the vertical and horizontal field sensors in a sensor unit. Thus, in FIG. 2A, the field sensor 30 protrudes out of the page. FIG. 2B is a schematic diagram which more clearly shows the orientation of the wideband electromagnetic field sensors 26, 28 and 30 shown in FIG. 2A. As shown, the wideband sensors form local x, y and z axes so that measured data would be $S_x$, $S_y$, and $S_z$, where $S_x$ is measured by wideband sensor 28, $S_y$ is measured by wideband sensor 26, and $S_z$ is measured by wideband sensor 30. Although three sensors are shown in FIG. 2A in the sensor unit, for purposes of illustration, more than three wideband sensors can be employed to traverse the area of interest 32. Each sensor receives multiple frequencies from underground cables 34 and 36 within the area of interest. These frequencies are separated by software, frequency filters or other known frequency separator means at 38, 40 and 42. The RF frequencies may be applied to the cables 34 and 36 by one or more of the transmission systems previously noted, one of which is a plurality of narrowband RF transmitters 44, 46, 48 and 50 located within the area of interest 32. Each of these transmitters transmits a different narrowband frequency, so that multiple frequencies are received by the wideband sensors 26, 28 and 30.

The sensors 26, 28 and 30 are directional sensors with elongate, ferrite cores, and are oriented to each provide a different component of a vector, the geometry of which points to a source; the underground cable. The magnetic fields measured by the sensors 26, 28, and 30 are vector fields so that they have magnitude and direction. The magnitude of the field at any time can be computed from $S_{total}=(S_x^2+S_y^2+S_z^2)^{1/2}$, and the direction can be computed from the ratios of the three measurements. Since $S_x$, $S_y$ and $S_z$ totally describe the measured vector field, sensors which are angled, for example at 45 degrees, is not necessary as used in other conventional systems. Instead, response at any angle can be computed from the data obtained. The rapidity at which the magnetic field from a cable falls off as the sensor moves away from the cable provides and indication of cable depth. For example, with a shallow cable, the magnetic field falls off rapidly as the sensor moves away from the cable. This spatial decay of the magnetic field can be used to obtain an indication of cable depth.

The data from each utility sensor is separately stored in the data logger 20 and is separately provided to the processor 22 and mapped. This spatially registered data is plotable on a map which can be viewed and interpreted by a human operator, or alternatively, the data can be processed by the processor 22 where it is automatically analyzed.

Area positioning data can be provided by a GPS, laser, radio positioning system, ultrasonic and/or other appropriate positioning devices, and all digital data from the underground utility sensors and the area positioning system may be provided to the processor which provides the required data analysis. The automatic analysis approach used exploits the fact that underground utilities are approximately linear, at least over short distances. Thus the processing steps performed include:

1. Detect and locate peaks in the sensor data.
2. Beamform the data (either the detected peaks, the raw sensor data, or some processed data) to a suite of directions to see which orientation indicates the presence of a linear feature.
3. Select the orientation with the best indication of a linear feature.
4. Fit the data that corresponds to the linear feature to a curve that represents the location of the utility.
5. Remove from the data set those data that are described by this interpreted utility.

6. Return to step #2 to repeat the process until a stopping criteria has been met.

Detect and Locate Peaks in the Sensor Data

The fundamental aspect of this invention is beamforming, which can operate on raw sensor data. However, we find it more valuable to operate the beamforming on a subset of data, the detected peaks in the data, where the peaks represent anomalies. Thus, the first step in the process is to select the data points that correspond to local maxima.

There are many ways of constructing a signal detector, most of which exist in some form in the literature. It is important to understand that our process operates on a suite of data that was collected by sensors moving along a path. Therefore, the data is sequential or, at a minimum, a set of sequential data sets. The data can be considered as a whole (all the data collected within an area) or as a sequence where each data point has nearest neighbors. We then:

1. Compute the alpha-trimmed mean and standard deviation. The alpha-trimmed mean is a common statistical tool for estimating the mean when outliers are expected in the data (which they are). To compute this, all the data in the suite are rank-ordered by value, and a predefined percentage (alpha) of the largest and the smallest values are removed (trimmed) from the data set. Then, the mean (MEAN) and standard deviation (STDEV) of the remaining values are computed.

2. The detection threshold, DT, is defined as DT=constant*STDEV+MEAN, where the constant is a predetermined value, typically on the order of 1.0 to 3.0 in value.

3. A multiple peak detection threshold, DT2, is defined as SDT=constant2*STDEV, where constant2 is a predetermined value, typically on the order of 1.0 to 2.0 in value.

4. Taking the data in sequential order, all local maxima that exceed DT are selected.

5. For these selected maxima, the intervening data points are investigated to assure that the data values either a) reduce to DT, or b) reduce by an amount DT2 and increase by an amount DT2. That is, if we have two adjacent peaks that both exceed DT, the intervening data values must either decrease below the detection threshold or decrease by at least DT 2 and increase by at least DT2 for both peaks to be retained. If these criteria are not met, then the larger of the peaks is maintained and the other peak is discarded.

6. This list of detections is retained, along with corresponding position data.

Beamform the Data

This step is a key aspect of the invention. Beamforming is a common tool in wave propagation activities. In this case, we are not dealing with wave propagation, but instead with linear features. Thus, we are applying a wave propagation method to a different application.

Figure 3:
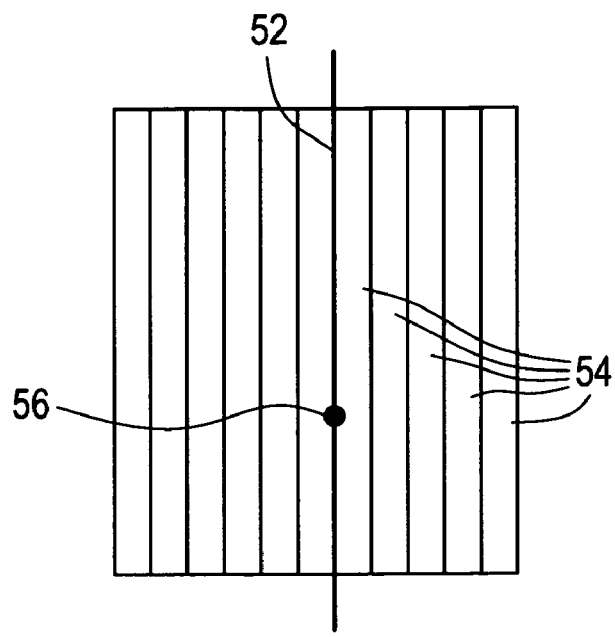
FIG. 3 is a diagram of a first beamforming orientation used for data analysis in accordance with the present invention.
Figure 4:
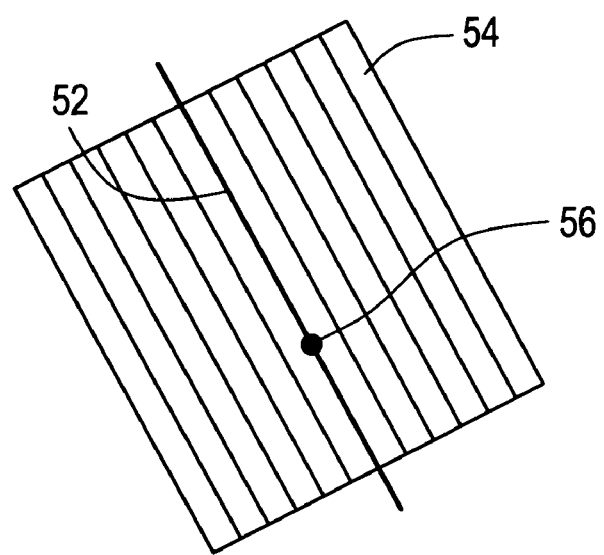
FIG. 4 is a diagram of a second beamforming orientation used for data analysis in accordance with the present invention.

Because we can assume the utilities will be linear over some span, our method searches for linear features. It investigates over a complete span of orientation, integrating the data within windows of predefined size. FIGS. 3 and 4 show an example.

The figures represent an overlay on a contour map. The line 52 is the beamforming axis. The FIG. 3 overlay is vertical (likely to be north-south on a map). Each of the black rectangles 54 comprises a bin. Within each bin, all the detected peaks are summed, so that we get a count of the number of peaks within each bin. The width of the bins is chosen so that a bin is sufficiently large to contain most of the detected peaks that were the causative utility to be orientated parallel to the beamforming axis 52. The length of the bins is simply long enough to cover all the mapped area. A bin width of a meter or two would be typical. We choose to use bins with 50% overlap (so that each data point lies within two bins), but we show the non-overlapping bins for clarity in the figures.

The dot 56 is an arbitrary point selected as the axis of rotation. The axis of rotation can be any selected point, but is usually selected to be near the middle of the area where data were collected. After we have a count of all the detected peaks within each bin for the original orientation, we then rotate the beamforming axis and the bins to a new orientation, as shown in FIG. 4. With this new orientation, we count the number of detected peaks in each bin.

A suite of angles is tested in this manner to cover all possible orientations. Each bin at each angle is considered independent of bins at other angles. The angle of rotation should be no more than the arctangent of the ratio of the bin width to the bin height.

Select the Orientation with the Best Indication of a Linear Beam

With all angles tested, we can look at our list of bins of each angle and determine which bin at which angle contains the most detected peaks. This bin at this angle is selected as indicating the presence of an underground utility.

Fit the Detected Beam to a Curve that Represents the Location of the Utility

Coordinates of detections which lie within a selection beam are used to estimate the location of the beam. These coordinates are fit to a smooth curve to estimate the location of the utility. The length of the utility is determined by the distribution of detected peaks.

Remove from the Data Set Those Data that are Described by this Interpreted Utility The original data set of all detected peaks is now selected and all detected peaks that were used in the curve-fitting in the previous step are removed. This reduced data set will contain all detected peaks minus those that have been "explained" by interpretation as a utility.

Return to Step #2 to Repeat the Process Until a Stopping Criteria Has Been Met

If additional detections remain, the process is repeated, returning to calculate the number of peaks within each bin for each angle using the reduced data set. At some point, this process must terminate. Various termination criteria could be employed:

Continue until all detected peaks have been modeled.

Continue until all except a fixed percent (possibly 5–10%) have been explained.

Continue until modeled utilities are inconsistent with the data (that is, when the fit curves representing the utility cross data points that are clearly not consistent with the data).

Other terminating criteria could be employed.

Additional Analysis

Further processes could a) determine which segments of interpreted utilities from the prior analyses should be connected, b) integrate results from multiple sensors to produce a single, common result, c) estimate depth along the length of all utilities, and d) identify type and size of the utilities.

Figure 5:
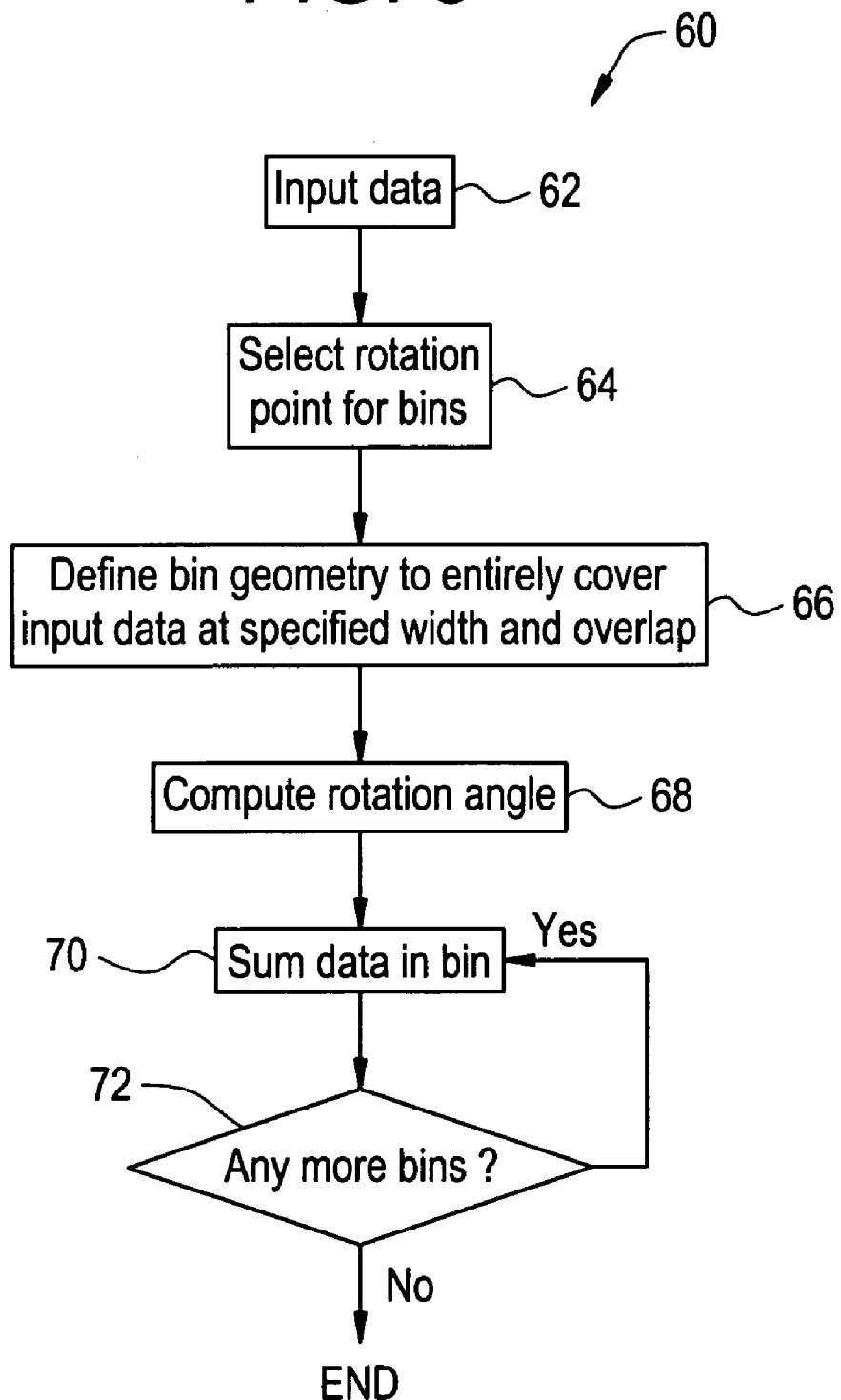
FIG. 5 is a schematic flow diagram showing the beamforming process in accordance with one embodiment of the present invention.

In the above regard, FIG. 5 shows a schematic flow diagram 60 showing the beamforming process where bins are created in accordance with one embodiment of the present invention. As shown, input data is provided in step 62 and rotation point for bins is selected in step 64. Step 66 defines the bin geometry to entirely cover the input data at specified width and overlap. The rotation angle is computed in step 68 and the data in a bin is summed in step 70. A determination is made as to whether there are any more bins in step 72. If there are additional bins, step 70 is repeated for all the bins. When all the data is summed in all the bins, the beamforming process is ended. The output of the beamforming process shown may be in tabular form (not shown) in which the x-axis indicate the angles that the bins are rotated to while the y-axis indicate the bin numbers, such bin numbers being assigned when the bins are created. The entries in the table would be the result of the summing of data for each bin at each angle.

Figure 6:
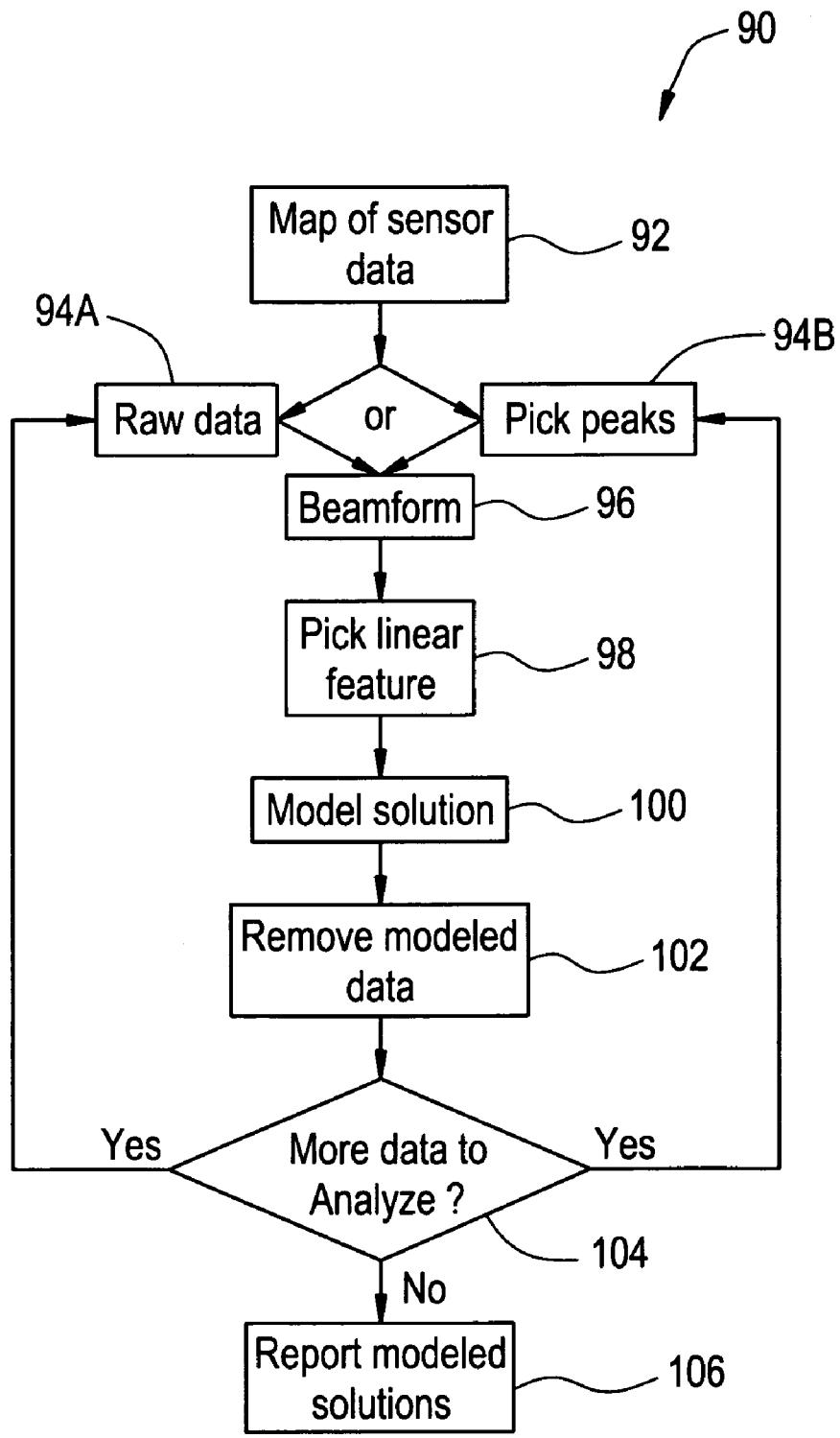
FIG. 6 is a schematic flow diagram of an automatic interpretation/analysis process in accordance with one embodiment of the present invention.

FIG. 6 is a schematic flow diagram 90 showing the overall automatic interpretation/analysis process in accordance with one embodiment of the present invention. It should be noted that the process 90 may be applied to raw data or picked peaks. Thus, as shown, after map of sensor data is provided in step 92, raw data may be analyzed via step 94A or alternatively, the peaks may be analyzed in step 94B. The raw data or picked peaks are beamformed in step 96 in the manner shown in FIG. 5 discussed above. A linear feature is selected in step 98 by selecting the maximum value from the table created during beamforming step 96 which was described in further detail relative to FIG. 5. By selecting the maximum value, the approximate location of the utility is determined and the location may then be fine-tuned by more carefully modeling the chosen solution. In this regard, a model solution is determined in step 100 and the modeled data is removed in step 102 in the manner discussed above. If there are addition data to analyze, the process loops back to either of step 94A or 94B depending on the type of data being analyzed. Upon completion, the modeled solution is reported in step 106.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. A method for locating underground utilities within an area of interest which includes:
    traversing back and forth across said area of interest with a plurality of underground utility sensors to cover the area of interest,
    continuously obtaining sensor data from each of said plurality of underground utility sensors while traversing said area of interest, said sensor data being indicative of presence of an underground utility, said step of continuously obtaining sensor data being electronically performed without requiring interpretive action by an operator as to the position of the underground utility during said traversing of said area of interest,
    substantially automatically storing said sensor data in a data storage device,
    substantially simultaneously obtaining continuous area location data from a position locating system while traversing said area of interest to obtain area location data indicative of the location of the area of interest traversed while obtaining said sensor data,
    directly providing said stored sensor data and said location data to a processor, and
    electronically processing by spatial beamforming said sensor data stored in said data storage device using said processor and to determine anomalies in said sensor data, and further processing said sensor data with the anomalies together with said area location data using said processor to map the location of one or more underground utilities within said area of interest based on spatial variability of said sensor data.

2. The method of claim 1 which includes using the sensor data from each of said plurality of underground utility sensors with said area location data to create a separate map.

3. The method of claim 2 which includes obtaining sensor data from each of a plurality of different underground utility sensors, each of said plurality of different underground utility sensors being a different sensor type having different mode of operation from one another.

4. The method for locating underground utilities within an area of interest which includes:
    traversing back and forth across said area of interest with a plurality of underground utility sensors to cover the area of interest,
    continuously obtaining and substantially automatically storing sensor data from each of said plurality of different underground utility sensors while traversing said area of interest, each of said plurality of different underground utility sensors being a plurality of wideband electromagnetic field sensors that operate in multiple frequencies, said continuously obtaining sensor data being electronically performed without requiring interpretive action by an operator as to the position of the underground utility during said traversing of said area of interest,
    substantially simultaneously obtaining continuous area location data from a position locating system while traversing said area of interest to obtain area location data indicative of the location of the area of interest traversed while obtaining said sensor data,
    electronically processing said sensor data together with said area location data to map the location of one or more underground utilities within said area of interest, electronic processing of said sensor data including spatial beamforming of said sensor data; and
    using the sensor data from each of said plurality of underground utility sensors with said area location data to create a separate map.

5. The method of claim 4 which includes separating the frequencies in the sensor data having multiple frequencies for each wideband electromagnetic field sensor into separate frequency related sensor data outputs.

6. A method for locating underground utilities within an area of interest which includes:
    traversing back and forth across said area of interest with a plurality of underground utility sensors to cover the area of interest,
    obtaining sensor data from each of said plurality of underground utility sensors while traversing said area of interest, obtaining area location data from a position locating system while traversing said area of interest to obtain area location data indicative of the location of the area of interest traversed,
    using said sensor data and area location data to map the location of one or more underground utilities within said area of interest, including spatial beamforming the sensor data to a suite of angles which cover all possible orientations of the underground utility to determine which orientation contains sensor data which indicates the presence of a linear feature; and integrating the location data with the data that corresponds to the linear feature to determine the location of the underground utility.

7. The method of claim 6 which includes locating peaks in the sensor data which represent anomalies and beamforming the peaks to a suite of angles and determining which orientation includes the highest number of peaks as an indication of a linear feature.

8. The method of claim 7 which includes comparing said located peaks with a predetermined threshold value and selecting the peaks which exceed said predetermined threshold value for beamforming to said suite of angles.

9. A method for locating underground utilities within an area of interest which includes:
   traversing back and forth across said area of interest with a plurality of underground utility sensors to cover the area of interest,
   obtaining sensor data from each of said plurality of underground utility sensors while traversing said area of interest,
   obtaining area location data from a position locating system while traversing said area of interest to obtain area location data indicative of the location of the area of interest traversed,
   using said sensor data and area location data to map the location of one or more underground utilities within said area of interest, including beamforming the sensor data to a suite of angles which cover all possible orientations of the underground utility to determine which orientation contains sensor data which indicates the presence of a linear feature, locating peaks in the sensor data which represent anomalies and beamforming the peaks to a suite of angles and determining which orientation includes the highest number of peaks as an indication of a linear feature, comparing said located peaks with a predetermined threshold value and selecting the peaks which exceed said predetermined threshold value for beamforming to said suite of angles, and integrating the location data with the data that corresponds to the linear feature to determine the location of the underground utility,
   rank ordering all sensor data in a data set by value;
   removing from the data set a predefined percentage of the largest and smallest values of the ranked sensor data in the data set; and
   computing the mean and standard deviation of the remaining values in the ranked sensor data in the data set before comparing the peaks with said predetermined threshold value.

10. The method of claim 9 wherein said predetermined threshold value is equal to a constant*standard deviatio+mean.

11. The method of claim 10 wherein said constant is 1.0 to 3.0 in value.

12. A method for detecting underground utilities within an area of interest which includes:
   obtaining area location data from a position locating system to identify the location of said area of interest,
   obtaining sensor data from said area of interest using a plurality of different underground utility sensors;
   spatial beamforming the sensor data to a suite of angles which cover all possible orientation of a sensed underground utility to determine which orientation contains sensor data which indicates the presence of a linear feature; and
   mapping the sensor data indicative of the presence of a linear feature.

13. The method of claim 12 which includes locating peaks in the sensor data which represent anomalies and beamforming the peaks to a suite of angles and determining which orientation includes the highest number of peaks as an indication of a linear feature.

14. The method of claim 13 which includes comparing said located peaks with a predetermined threshold value and selecting the peaks which exceed said predetermined threshold value for beamforming to said suite of angles.

15. The method of claim 12 which includes traversing said area of interest with said position locating system and said underground utility sensors and obtaining a plurality of sequential data sets, each of which includes location data and sensor data,
   spatial beamforming the sensor data from each data set to said suite of angles to determine which orientation contains sensor data which indicates the presence of a linear feature; and
   integrating the location data for each data set with data for said data set that corresponds to the linear feature to determine the location of the portion of the underground utility within the area from which said data set was obtained.

16. The method of claim 15 which includes locating peaks in the sensor data for each data set which represent anomalies and beamforming the peaks located in each data set to a suite of angles; and
   determining which orientation includes the highest number of peaks as an indication of a linear feature.

17. The method of claim 16 which includes comparing said located peaks with a predetermined threshold value and selecting the peaks which exceed said predetermined threshold value for beamforming to said suite of angles.

18. A method for detecting underground utilities within an area of interest which includes:
   obtaining area location data from a position locating system to identify the location of said area of interest,
   obtaining sensor data from said area of interest using a plurality of different underground utility sensors;
   obtaining of area location data and sensor data including traversing said area of interest with said position locating system and said underground utility sensors and obtaining a plurality of sequential data sets, each of which includes said location data and said sensor data;
   beamforming the sensor data to a suite of angles which cover all possible orientation of a sensed underground utility to determine which orientation contains sensor data which indicates the presence of a linear feature, including beamforming the sensor data from each data set to said suite of angles to determine which orientation contains sensor data which indicates the presence of a linear feature;
   mapping the sensor data indicative of the presence of a linear feature, said mapping including integrating the location data for each data set with data for said data set that corresponds to the linear feature to determine the location of the portion of the underground utility within the area from which said data set was obtained, locating peaks in the sensor data for each data set which represent anomalies and beamforming the peaks located in each data set to a suite of angles, determining which orientation includes the highest number of peaks as an indication of a linear feature, comparing said located peaks with a predetermined threshold value and selecting the peaks which exceed said predetermined threshold value for beamforming to said suite of angles;
   rank ordering all sensor data in a data set by value;

removing from the data set a predefined percentage of the largest and smallest values of the ranked sensor data in the data set; and computing the mean and standard deviation of the remaining values in the ranked sensor data in the data set before comparing the peaks with said predetermined threshold value.

19. The method of claim 18 wherein said predetermined threshold value is equal to a constant*standard deviation+mean.

20. The method of claim 19 wherein said constant is 1.0 to 3.0 in value.

21. A device for locating underground utilities within an area of interest comprising:

a movable multisensor unit for detecting presence of underground utilities within the area of interest, said movable multisensor unit including a base, at least two different underground utility sensing units, each of said at least two different underground utility sensing units being a different sensor type having different mode of operation mounted on said base and providing continuous separate data outputs indicating presence of underground utilities during operation when said base is moved over said area of interest, said data outputs being continuously provided without requiring interpretive action by an operator as to position of said underground utility, and being substantially automatically stored, and a position locating receiver mounted on said base for substantially simultaneously receiving continuous positional data relating to the position of the area of interest over which said base is moved, and a mapping unit to receive positional data from said position locating receiver and the data outputs from said underground utility sensing units, said mapping unit having a processor that directly receives said positional data and said data outputs, and operating to determine anomalies in said data outputs of said underground utility sensing units, to electronically process said positional data to map said area of interest, and to electronically process by spatial beamforming the data outputs from said underground utility sensing units with the anomalies using said processor to electronically map data signals indicative of the location of underground utilities within said area of interest based on spatial variability of said data outputs from said underground utility sensing units.

22. A device for locating underground utilities within an area of interest comprising:

a movable multisensor unit for detecting underground utilities within the area of interest, said movable multisensor unit including a base, at least two different underground utility sensing units having different modes of operation mounted on said base to provide separate data outputs when said sensing units sense underground utilities during movement of said base over said area of interest, and a position locating receiver mounted on said base for receiving positional data relating to the position of the area of interest over which said base is moved, and a mapping unit to receive positional data from said position locating receiver and the data outputs from said underground utility sensing units, said mapping unit operating in response to said positional data to map said area of interest and in response the data outputs from said underground utility sensing units to map data signals indicative of the location of underground utilities within said area of interest;

wherein said movable multisensor unit includes a cable locator with three or more wideband electromagnetic field sensors with at least one sensor oriented vertically, one sensor oriented horizontally and one sensor oriented orthogonal to said vertically and horizontally oriented sensors, each sensor operating to receive multiple frequencies from an underground utility and to provide a data output which includes one or more of said multiple frequencies.

23. The device of claim 22 wherein said cable locator includes frequency separator means operative to receive the multiple frequencies in the data output from each of said wideband electromagnetic field sensors and to separate each frequency into a single frequency output.

24. A device for locating underground utilities within an area of interest comprising:

a movable multisensor unit for detecting presence of underground utilities within the area of interest, said movable multisensor unit including a base, at least two different underground utility sensing units, each of said at least two different underground utility sensing units being a different sensor type having different mode of operation mounted on said base and providing continuous separate data outputs indicating presence of underground utilities during operation when said base is moved over said area of interest, said data outputs being continuously provided without requiring interpretation of an operator as to position of said underground utility and being substantially automatically stored, and a position locating receiver mounted on said base for substantially simultaneously receiving continuous positional data relating to the position of the area of interest over which said base is moved, and a mapping unit to receive positional data from said position locating receiver and the data outputs from said underground utility sensing units, said mapping unit having a processor, and operating to electronically process said positional data to map said area of interest, and to electronically process the data outputs from said underground utility sensing units using said processor by spatial beamforming the data outputs to electronically map data signals indicative of the location of underground utilities within said area of interest based on spatial variability of said data outputs from said underground utility sensing units;

wherein said movable multisensor unit includes a cable locator with two or more magnetic coil sensors, each sensor operating to receive multiple frequencies from an underground utility and to provide a data output which includes said multiple frequencies simultaneously.

25. The device for locating underground utilities within an area of interest comprising:

a movable multisensor unit for detecting underground utilities within the area of interest for continuously electronically obtaining sensor data during operation without requiring interpretive action by an operator as to the position of the underground utility in said area of interest, said movable multisensor unit including a base, at least two different underground utility sensing units, each of said at least two different underground utility sensing units being a different sensor type having different mode of operation mounted on said base and providing continuous separate data outputs indicating presence of underground utilities during operation when said base is moved over said area of interest, said data outputs being substantially automatically stored, and a position locating receiver mounted on said base for receiving continuous positional data relating to the position of the area of interest over which said base is moved, and a mapping unit to receive positional data from said position locating receiver and the data outputs from said underground utility sensing units, said mapping unit operating to electronically process said positional data to map said area of interest, and to electronically process the data outputs from said underground utility sensing units by spatial beamforming to map data signals indicative of the location of underground utilities within said area of interest, wherein said movable multisensor unit includes a cable locator with two or more magnetic coil sensors, each sensor operating to receive multiple frequencies from an underground utility and to provide a data output which includes one or more of said multiple frequencies, and wherein said cable locator includes frequency separator means operative to receive the multiple frequencies in the data output from each of said magnetic coil sensors and to separate each frequency into a single frequency output.

26. A device for locating underground utilities within an area of interest comprising:

a movable multisensor unit for detecting underground utilities within the area of interest;

said movable multisensor unit including a cable locator including three or more wideband electromagnetic field sensors with at least one sensor oriented vertically, one sensor oriented horizontally and one sensor oriented orthogonal to said vertically and horizontally oriented sensors, each sensor operating to receive multiple frequencies from an underground utility and to provide a data output which includes one or more of said multiple frequencies, and frequency separator means operative to receive the multiple frequencies in the data output from each of said sensors and to separate each frequency into a single frequency output.

27. The device of claim 26 which includes a plurality of narrowband RF transmitters located in said area of interest, each of said RF transmitters transmitting a different narrowband frequency.

28. A method for locating underground utilities within an area of interest which includes:

traversing back and forth across said area of interest with a plurality of underground utility sensors to cover the area of interest, said plurality of underground utility sensors being a plurality of wideband electromagnetic field sensors having multiple frequencies, continuously obtaining sensor data from each of said plurality of underground utility sensors while traversing said area of interest, said obtaining of sensor data being electronically performed without requiring interpretive action by an operator as to the position of the underground utility during said traversing of said area of interest, substantially automatically storing said sensor data, substantially simultaneously obtaining continuous area location data from a position locating system while traversing said area of interest to obtain area location data indicative of the location of the area of interest traversed, and electronically processing said sensor data by spatial beamforming together with said area location data to electronically map the location of one or more underground utilities within said area of interest.

* * * * *

UNITED STATES PATENT AND TRADEMARK OFFICE
CERTIFICATE OF CORRECTION

| | |
|---|---|
| PATENT NO. | : 6,999,021 B2 |
| APPLICATION NO. | : 10/095110 |
| DATED | : February 14, 2006 |
| INVENTOR(S) | : David W. A. Taylor, Jr. et al. |

Page 1 of 1

It is certified that error appears in the above-identified patent and that said Letters Patent is hereby corrected as shown below:

On the title, item:
(75) Inventors: "John S. ROLLAND" should read --John S. ROLAND--.

Signed and Sealed this

Fifteenth Day of August, 2006

JON W. DUDAS
*Director of the United States Patent and Trademark Office*